US011130110B2

(12) United States Patent
Toloza Porras et al.

(10) Patent No.: US 11,130,110 B2
(45) Date of Patent: Sep. 28, 2021

(54) DEVICE FOR INJECTING AND MIXING A REACTIVE FLUID IN HIGH PRESSURE LDPE PROCESSES

(71) Applicant: SABIC GLOBAL TECHNOLOGIES B.V., Bergen op Zoom (NL)

(72) Inventors: Carolina De Los Angeles Toloza Porras, Geleen (NL); Diego Mauricio Castaneda Zuniga, Geleen (NL); Hua Bai, Sugar Land, TX (US); Robert Cornelis Van Bodegom, Geleen (NL); Mohsen Nikkhoo, Sugar Land, TX (US); Bas Eugene Hans Megens, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 195 days.

(21) Appl. No.: 16/475,245

(22) PCT Filed: Jan. 4, 2018

(86) PCT No.: PCT/EP2018/050195
§ 371 (c)(1),
(2) Date: Jul. 1, 2019

(87) PCT Pub. No.: WO2018/127533
PCT Pub. Date: Jul. 12, 2018

(65) Prior Publication Data
US 2019/0336929 A1 Nov. 7, 2019

Related U.S. Application Data

(60) Provisional application No. 62/492,478, filed on May 1, 2017.

(30) Foreign Application Priority Data

Jan. 6, 2017 (EP) .................................... 17150517

(51) Int. Cl.
*B01J 4/00* (2006.01)
*B01F 5/04* (2006.01)
(Continued)

(52) U.S. Cl.
CPC ............. *B01J 4/002* (2013.01); *B01F 5/0461* (2013.01); *B01J 19/06* (2013.01); *B01J 19/26* (2013.01);
(Continued)

(58) Field of Classification Search
USPC ........................................ 239/433, 589, 592
See application file for complete search history.

(56) References Cited

U.S. PATENT DOCUMENTS 6,951,908 B2 * 10/2005 Groos ................... B01F 5/0473
422/129
8,308,087 B2 11/2012 Berbee et al.
(Continued)

FOREIGN PATENT DOCUMENTS

DE 202010017478 U1 3/2012
EP 0207161 A1 1/1987
(Continued)

OTHER PUBLICATIONS

European Search Report; EP Application No. 17150517.5; Filing Date: Jan. 6, 2017; dated Jan. 6, 2017; 2 pages.
(Continued)

*Primary Examiner* — Fred M Teskin
(74) *Attorney, Agent, or Firm* — Cantor Colburn LLP

(57) ABSTRACT

The invention relates to a device (100) for injecting and mixing a reactive fluid in a flow of a process fluid for the preparation of polyolefins, comprising: •an annular part (101) having an outer wall and an inner wall (102), wherein the annular part (101) is arranged for having a flow of the process fluid in a transport direction (F); •a support structure
(Continued)

(103) connected to the inner wall (102) of the annular part (101); •an injector part (104) mounted on the support structure (103), wherein the injector part (104) is cylindrically shaped and wherein the cylindrical axis A-A' of the injector part is parallel with a central axis of the annular part and is in the central part of the annular part (101); wherein the injector part (104) comprises a nozzle (105) for injecting the reactive fluid, disposed at a downstream side of the injector part relative to the transport direction (F); •a supply channel (106) extending from the outer wall of the annular part (101) through the support structure (103) to the nozzle (105) of the injector part (104), and wherein the annular part (101), the support structure (103) and the injector part (104) are made from a single piece of metal.

16 Claims, 3 Drawing Sheets

(51) Int. Cl.
  *B01J 19/06* (2006.01)
  *B01J 19/26* (2006.01)
  *C08F 10/02* (2006.01)
  *F16J 15/06* (2006.01)
(52) U.S. Cl.
  CPC ...... *C08F 10/02* (2013.01); *B01F 2215/0036* (2013.01); *F16J 15/06* (2013.01)

(56) References Cited

U.S. PATENT DOCUMENTS

| | | | |
|---|---|---|---|
| 2008/0163627 A1* | 7/2008 | ELKady | F23R 3/14 60/737 |
| 2015/0157991 A1 | 6/2015 | Beg et al. | |
| 2016/0195050 A1 | 7/2016 | Green | |

FOREIGN PATENT DOCUMENTS

| | | |
|---|---|---|
| EP | 0449092 B1 | 10/1991 |
| EP | 1711256 B1 | 10/2006 |
| FR | 2001694 A1 | 9/1969 |
| FR | 2550098 A1 | 2/1985 |
| SE | 1050194 A1 | 10/2011 |

OTHER PUBLICATIONS

International Search Report; International Application No. PCT/EP2018/050195; International Filing Date: Jan. 4, 2018; dated Apr. 11, 2018; 4 pages.

Peacock, "Handbook of Polyethylene" (2000; Dekker; ISBN 0824795466) pp. 43-66.

Written Opinion; International Application No. PCT/EP2018/050195; International Filing Date: Jan. 4, 2018; dated Apr. 11, 2018; 6 pages.

* cited by examiner

DEVICE FOR INJECTING AND MIXING A REACTIVE FLUID IN HIGH PRESSURE LDPE PROCESSES

CROSS REFERENCE TO RELATED APPLICATIONS

This application is a 371 of International Application No. PCT/EP2018/050195, filed Jan. 4, 2018, which is incorporated by reference in its entirety, and which claims priority to European Application No. 17150517.5, filed Jan. 6, 2017, and U.S. Application No. 62/492,478, filed May 1, 2017.

FIELD OF DISCLOSURE

The present invention relates to a device for injecting and mixing a reactive fluid in a flow of a process fluid. The present invention further relates to the use of such device in a high pressure ethylene reactor system and a process for the preparation of an ethylene polymer using such reactor system under high pressure conditions.

BACKGROUND

The production processes of polyethylene are summarized in Handbook of Polyethylene by Andrew Peacock (2000; Dekker; ISBN 0824795466) at pages 43-66. Many types of polyethylene exist. Examples of different classes of polyethylene are high density polyethylene (HDPE), low density polyethylene (LDPE), linear low density polyethylene (LLDPE) and very low density polyethylene (VLDPE).

LDPE can be used alone, blended or co extruded for a variety of packaging, construction, agricultural, industrial and consumer applications. The largest application of LDPE is in films produced for example by the blown or cast extrusion process in both mono and co extrusions. Films made with LDPE exhibit good optical properties, strength, flexibility, seal ability and chemical inertness. The end-use applications include packaging of bakery items, snack foods, consumer durables, disposable diapers, textiles, agricultural film and shrink film.

EP0207161 discloses a process for the preparation of an ethylene copolymer by introducing one or more comonomers into a tank-shaped or tubular reaction vessel by means of an ultrahigh pressure pump. EP0207161 describes the problems of introducing a highly reactive comonomer to the reaction vessel. The comonomers may polymerize in the inlet nozzle, which may cause clogging. The comonomers may not be sufficiently dispersed into ethylene gas in the reaction vessel, which causes local homopolymerization of the comonomer by-production of gel-like materials in the finished product.

U.S. Pat. No. 8,308,087 describes an initiator injection nozzle for injecting organic peroxides into a process fluid containing ethylene, and, optionally, one or more comonomers, to form a free-radical polymerized ethylene-based polymer product. U.S. Pat. No. 8,308,087 deals with the problem of inadequate distribution of initiator in ethylene, such as an unbalanced reaction profile in ethylene. U.S. Pat. No. 8,308,087 provides an initiator injection nozzle for mixing an initiator with a process fluid, comprising a stylus comprising a shaped injector tip forming the injector outlet of the initiator fluid flow passage, where the injector outlet is located in the constricting portion of the process fluid flow passage. The stylus is not fabricated from a single piece of metal as the body of the reactor.

EP1711256 describes a process for the preparation of a homopolymer or a copolymer of ethylene in a tubular polymerisation reactor. The inside surface of the reactor is profiled and due to the profiling the cross-sectional area of the tube is non-circular. This allows the production of LDPE film with improved gloss.

While known processes allow production of desirable ethylene polymers under some conditions, they are not always suitable for large scale production and/or production under very severe conditions due to the mixing profile of the injected reactive fluid in the process flow.

BRIEF SUMMARY

It is an object of the present invention to provide a device for a reactor system in which the above-described and/or other problems are solved.

Accordingly, the invention provides a device for injecting and mixing a reactive fluid in a flow of a process fluid, comprising an annular part having an outer wall and an inner wall, wherein the annular part is arranged for having a flow of the process fluid in a transport direction. The device further comprises a support structure connected to the inner wall of the annular part. The device further comprises an injector part mounted on the support structure, wherein the injector part is cylindrically shaped and the cylindrical axis of the injector part is parallel with the central axis of the annular part and is in the central part of the annular part. The injector part comprises a nozzle for injecting the reactive fluid, disposed at a downstream side of the injector part relative to the transport direction. The device further comprises a supply channel extending from the outer wall of the annular part through the support structure to the nozzle of the injector part.

DETAILED DESCRIPTION

Figure 1:
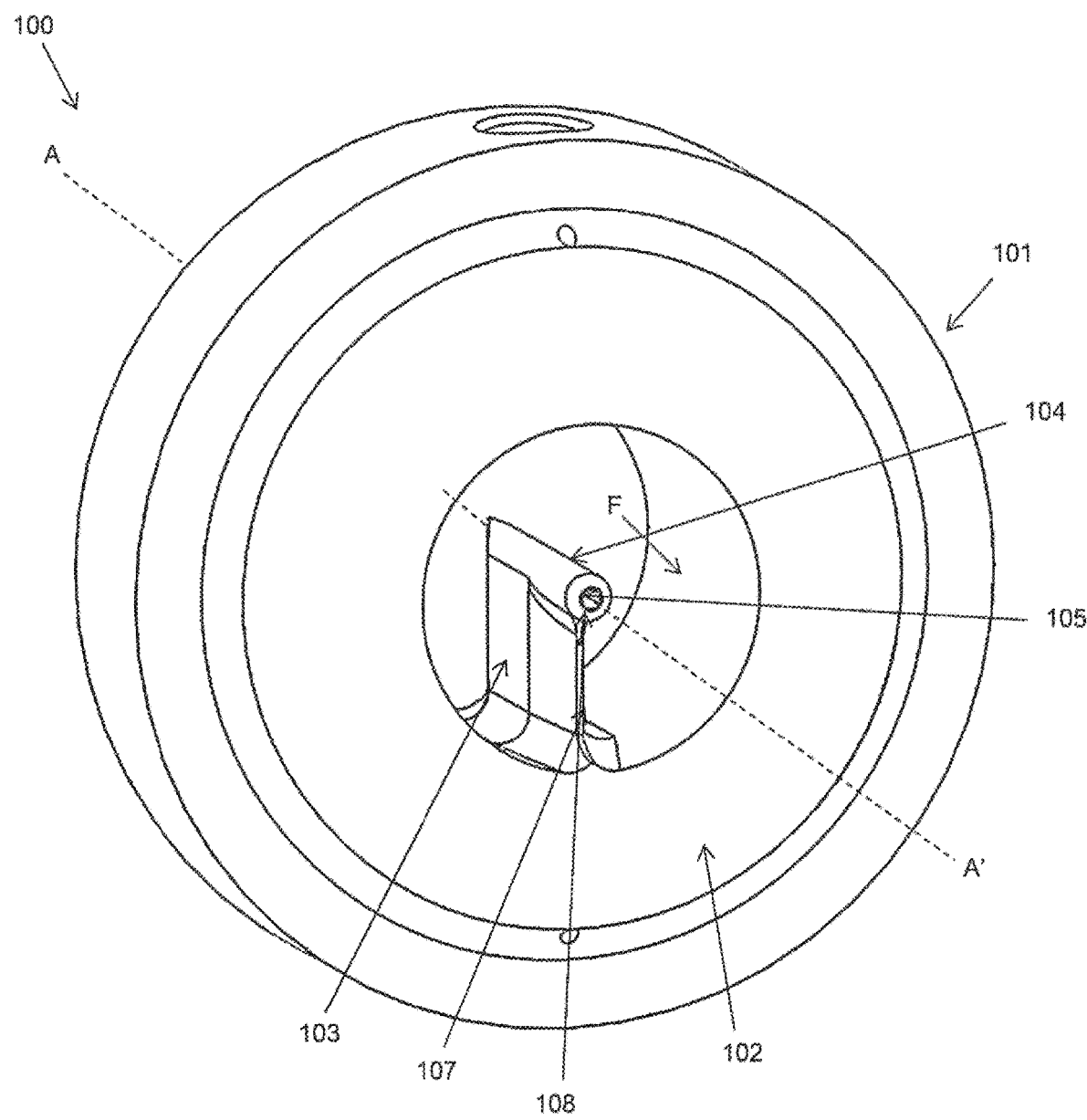
FIGS. 1-2 illustrates an embodiment of the device according to the invention.

It was found that the reactors of the prior art have the problem that the injected fluid to a turbulent flow of the process fluid may experience back mixing and material build-up or fouling at the inner wall of the reactor. The device according to the invention allows a good mixing of the injected fluid in a turbulent flow of the process fluid with a reduced back mixing. According to the invention, it was found that the downstream facing nozzle and cylindrical shape of the injector part cause minimal asymmetrical turbulence of the fluid flow within the device, thus in use allowing an even distribution of the injected fluid downstream the device according to the invention. The shapes of the injector part and the nozzle reduce back-mixing of the injected fluid. It was further found that introducing the reactive fluid from the nozzle situated in the central part of the annular part avoids the material build-up and fouling at the inner wall.

In highly preferred embodiments, the annular part, the support structure and the injector part (preferably all elements of the mixing device) are made from a single piece of metal. This reduces the possibility of the damage or crack of the support structure and the injector part in severe environments such as high pressure LDPE production environments. Particularly, the part which transitions from the annular part to the support structure has an improved mechanical strength by the support structure being made from the same piece of metal as the annular part.

Preferably, the cylindrical axis of the injector part is located at a distance of 0 to ¼ D, more preferably 0 to ⅛ D, from the central axis of the annular part, where D is the inner diameter of the annular part.

Preferably, the cylindrical axis of the injector part coincides with the central axis of the annular part.

Preferably, the support structure has a fin shape. This improves the mechanical strength compared to a cylindrical shape as in the prior art injection nozzle.

Preferably, the fin shaped support structure and the injector part have a common wedge shaped upstream front. The common wedge shaped upstream front further reduces drag experienced by the process flow within the device.

Preferably, the fin shaped support structure has a wedge shaped downstream front. The wedge shaped downstream front further reduces drag experienced by the process flow within the device.

Preferably, the fin shaped support structure has a rounded base where the fin shaped support structure is connected to the annular part. This smoothes the fluid flow around the support structure and streamlines the fluid flow passing through the device next to the support structure. Thereby undesired material build-up and fouling are further prevented. Moreover, erosion of the support structure is prevented, especially around the base. Additionally, the streamlined smooth design helps to reduce local stress which ensures mechanical integrity in a harsh environment.

Preferably, the nozzle is formed as a tapered extension of the injector part, having the nozzle opening in the center of the tapered extension.

Preferably, the tapered extension has a taper angle in a range of 15°-60°, preferably 20°-45°, more preferably 25°-35°. Such ranges of the taper angle are optimal in reducing back mixing.

The invention further relates to a lens ring gasket or a cone ring gasket comprising the device according to the invention.

The invention further relates to a reactor system comprising the device according to the invention, wherein a reactive fluid is to be injected and mixed with a flow of a process fluid in the device. The flow of the process fluid is a turbulent flow. The reactor system typically comprises a compressor and a reactor comprising a reaction section. In case of a tubular reactor system, a preheater section is present before the reaction section. In case of an autoclave reactor system, a heat exchanger is present before the reaction section.

The device may be placed in various parts of the reactor system wherein a reactive fluid is to be injected and mixed with a flow of a process fluid. The device may be placed in or prior to the reaction section in the reactor system. For example, the device may be attached to the compressor for injecting the reactive fluid to a flow of the process fluid in the compressor.

The invention further relates to a process for the preparation of a homopolymer or a copolymer of ethylene and a comonomer copolymerizable therewith in the polymerization reactor system according to the invention, wherein the process fluid comprises ethylene and the reactive fluid is selected from the group consisting of the comonomer, an initiator, an inhibitor, a scavenger and a chain regulator.

The pressure of the flow of the process fluid varies depending on the position of the device in the reactor system. For example, the pressure of the process fluid is typically 200-500 MPa when the device is placed in a tubular reactor; the pressure of the process fluid is typically 180-500 MPa when the device is attached to an autoclave reactor; the pressure of the process fluid is typically 20-50 MPa when the device is attached to a compressor.

The process fluid preferably comprises ethylene. The process fluid may be gas, liquid or supercritical fluid depending on the temperature and the pressure.

Typically, the reactive fluid comprises a comonomer copolymerizable with ethylene or one of the group consisting of an initiator, an inhibitor, a scavenger and a chain regulator. Depending on the type and the pressure, the reactive fluid may be liquid or supercritical fluid upon injection into the device.

Examples of suitable comonomers include $\alpha,\beta$-unsaturated carboxylic acids, in particular but not limited to maleic acid, fumaric acid, itaconic acid, acrylic acid, methacrylic acid and crotonic acid;

derivatives of $\alpha,\beta$-unsaturated carboxylic acids, e.g. unsaturated carboxylic esters, in particular but not limited to methyl methacrylate, ethyl methacrylate, n-butyl methacrylate or tert-butyl methacrylate, methyl acrylate, ethyl acrylate, n-butyl acrylate, 2-ethylhexyl acrylate, tert-butyl acrylate, 2-hydroxyethyl acrylate, 2-hydroxyethyl methacrylate, 3-hydroxypropyl acrylate, 3-hydroxypropyl methacrylate, 2-hydroxypropyl acrylate, 2-hydroxypropyl methacrylate, 2,3-dihydroxypropyl acrylate, 2,3-dihydroxypropyl methacrylate, 4-hydroxybutyl acrylate, 4-hydroxybutyl methacrylate, poly(propylene glycol) monoacrylate, poly(propyleneglycol) monomethacrylate, poly(ethylene glycol) monoacrylate, poly(ethylene glycol) monomethacrylate, poly(ethylenepropyleneglycol) monomethacrylate, 2-hydroxyethyl vinyl ether, 2-(dimethylamino)ethyl methacrylate, 2-(Diethylamino)ethyl methacrylate, 2-(Diethylamino) ethyl acrylate, 2-(Dimethylamino)ethyl acrylate, 2-Aminoethyl methacrylate hydrochloride, 2-Aminoethyl acrylate hydrochloride, N-[3-(Dimethylamino)propyl]methacrylamide, N-[3-(Dimethylamino)propyl]acrylamide, 2-(Diisopropylamino)ethyl methacrylate, 2-(Diisopropylamino)ethyl acrylate, 2-(tert-Butylamino)ethyl methacrylate, 2-(tert-Butylamino)ethyl acrylate, 3-(Dimethylamino) propyl acrylate, 3-(Dimethylamino)propyl methacrylate, 1,4-butanediol dimethacrylate, hexanediol dimethacrylate, ethylene glycol dimethacrylate, 1,3-butylene glycol dimethacrylate, dodecanediol dimethacrylate, glycerol dimethacrylate, 1,4-butanediol diacrylate, hexanediol diacrylate, ethylene glycol diacrylate, 1,3-butylene glycol diacrylate, dodecanediol diacrylate, glycerol diacrylate, poly(ethylene glycol) dimethacrylate, poly(propylene glycol) dimethacrylate, poly(ethylenepropyleneglycol) dimethacrylate, trimethylol propane trimethacrylate or trimethylol propane triacrylate; or unsaturated amides, in particular but not limited to methacrylamide, 2-hydroxypropyl methacrylamide, N-[3-(dimethylamino)propyl]methacrylamide, N,N-diethylmethacrylamide, N,N'-hexamethylenebis(methacrylamide);

or unsaturated anhydrides, in particular but not limited to methacrylic anhydride, maleic anhydride or itaconic anhydride;

1-olefins such as but not limited to propene, 1-butene, 1-pentene, 1-hexene, 1-heptene, 1-octene, 1-nonene, 1-decene, 1,4-hexadiene, 1,7-octadiene, 1,9-decadiene or 1,13-tetradecadiene;

cyclic olefins such as but not limited to cyclobutene, cyclopentene, cyclohexene, cycloheptene and cyclooctene, cyclooctadiene, cyclononene, cyclodecene, 1-methyl-1-cyclohexene, 3-methyl cyclohexene, alpha-pinene or norbornene;

Vinyl monomers such as but not limited to vinyl carboxylates, particularly preferably vinyl acetate, vinyl ether, particularly preferable 1,4-butanediol divinyl ether, poly(ethylene glycol) divinyl ether or di(ethyleneglycol) divinyl ether or styrene can be used as comonomers.

The initiator is typically an organic peroxide. Suitable organic peroxides include for example peroxyester, peroxyketone, peroxyketal and peroxycarbonate such as for example di-2-ethylhexyl-peroxydicarbonate, diacetylperoxydicarbonate, dicyclohexyl-peroxydicarbonate, tert.-amylperpivalate, cumyl perneodecanoate, tert.-butylpemeodecanoate, tert.-butyl perpivalate, tert.-butylpermaleinate, tert.-butylperisononanoate, tert.-butylperbenzoate, tert,-butylperoxy-2-ethylhexanoate. tert.-butyl-hydroperoxide, d-tert. butyl peroxide, di-isopropylbenzol hydroperoxide, di-isononanoyl peroxide, didecanoylperoxide, cumol hydroperoxide, methyl isobutyl ketone hydroperoxide, 2,2-bis-(tert.-butylperoxy)-butane and/or 3,4-dimethyl-3,4-diphenylhexane. Also difunctional or higher functional peroxides may be applied.

The fluid injected to the device of the invention may also be an inhibitor, a scavenger or a chain regulator (such as for example an alcohol, an aldehyde, a ketone, a mercaptan or an aliphatic hydrocarbon). Very suitable chain regulators are isopropyl alcohol, propane, propylene and propionic aldehyde.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

The invention is now elucidated by way of the following embodiments and examples, without however being limited thereto.

In FIG. 1 an embodiment of a device 100 for injecting and mixing a reactive fluid in a flow of a process fluid is shown. The device 100 has an annular part 101. Within the annular part 101 an injector part 104 is provided connected to a support structure 103. The support structure 103 is preferably fin shaped and has wedge shaped front 107 in the downstream as well as in upstream direction relative to the flow direction F of the process fluid in the device 100. This wedge shape can prevent back mixing as well as streamline the flow. The injector part 104 has a cylindrical body which is shown aligned with a central axis A-A' of the device 100. This central axis A-A' may coincide with a central axis of the tubular polymerization reactor. Alternative alignments may be considered. The central axis A-A' may also be located in a central region at a distance of 0 to ¼ of the diameter from the central axis of the annular part 104.

The support structure 103 and injector 104 have a supply channel (106, see FIG. 3) which is arranged to supply the reactive fluid to the nozzle 105. The nozzle 105 has a tapered end 108 extending from the injector body.

Figure 2:
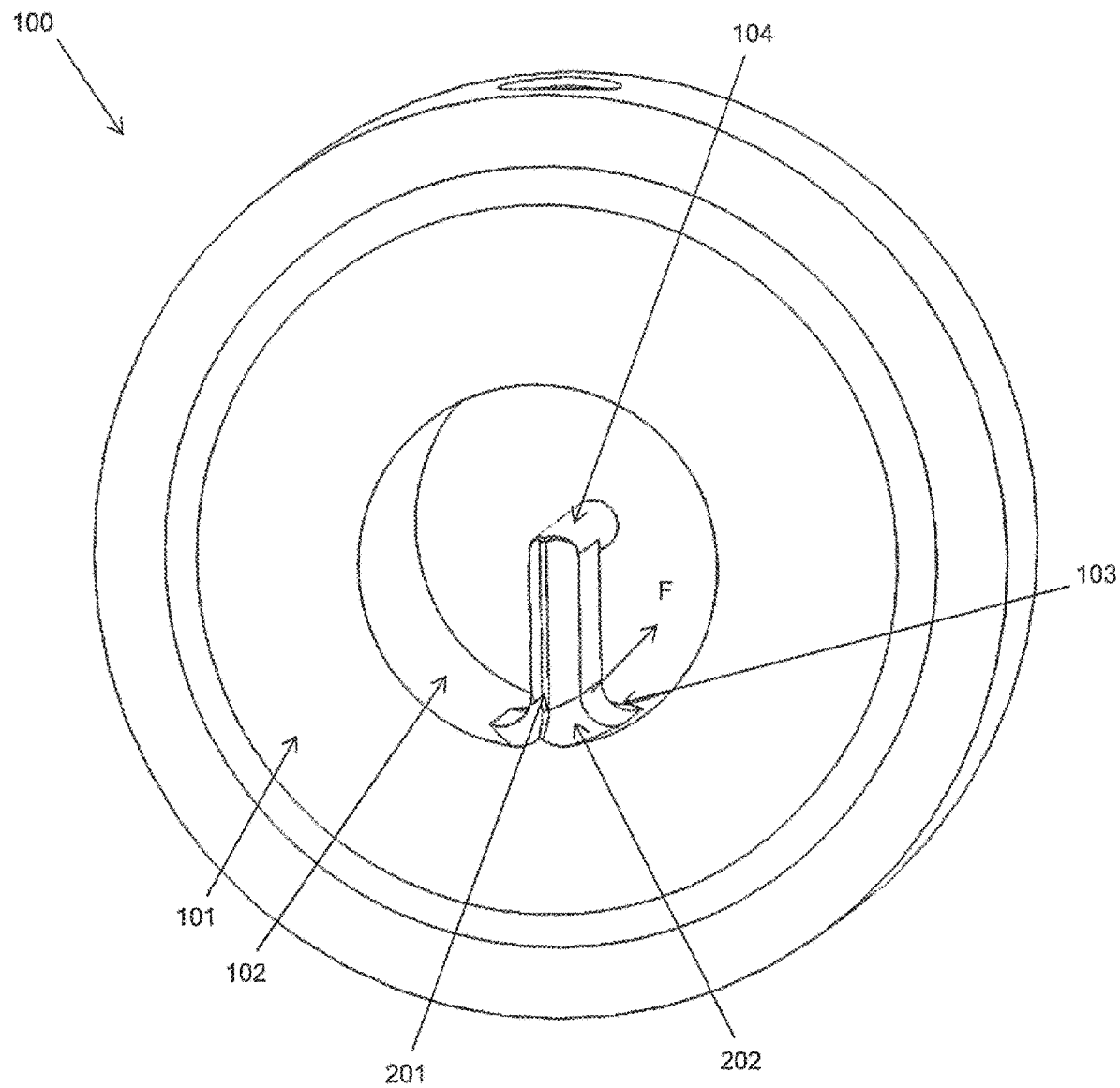

In FIG. 2 the device 100 is shown with a wedge shaped front 201 facing upstream. The upstream front of the injector part 104 and support structure 103 have a common front. As shown in FIG. 2, the support structure 103 is preferably connected to the inner wall 102 of the annular part 101 with a rounded base 202.

The device 100 is preferably manufactured as a single metal part by machining.

Figure 3:
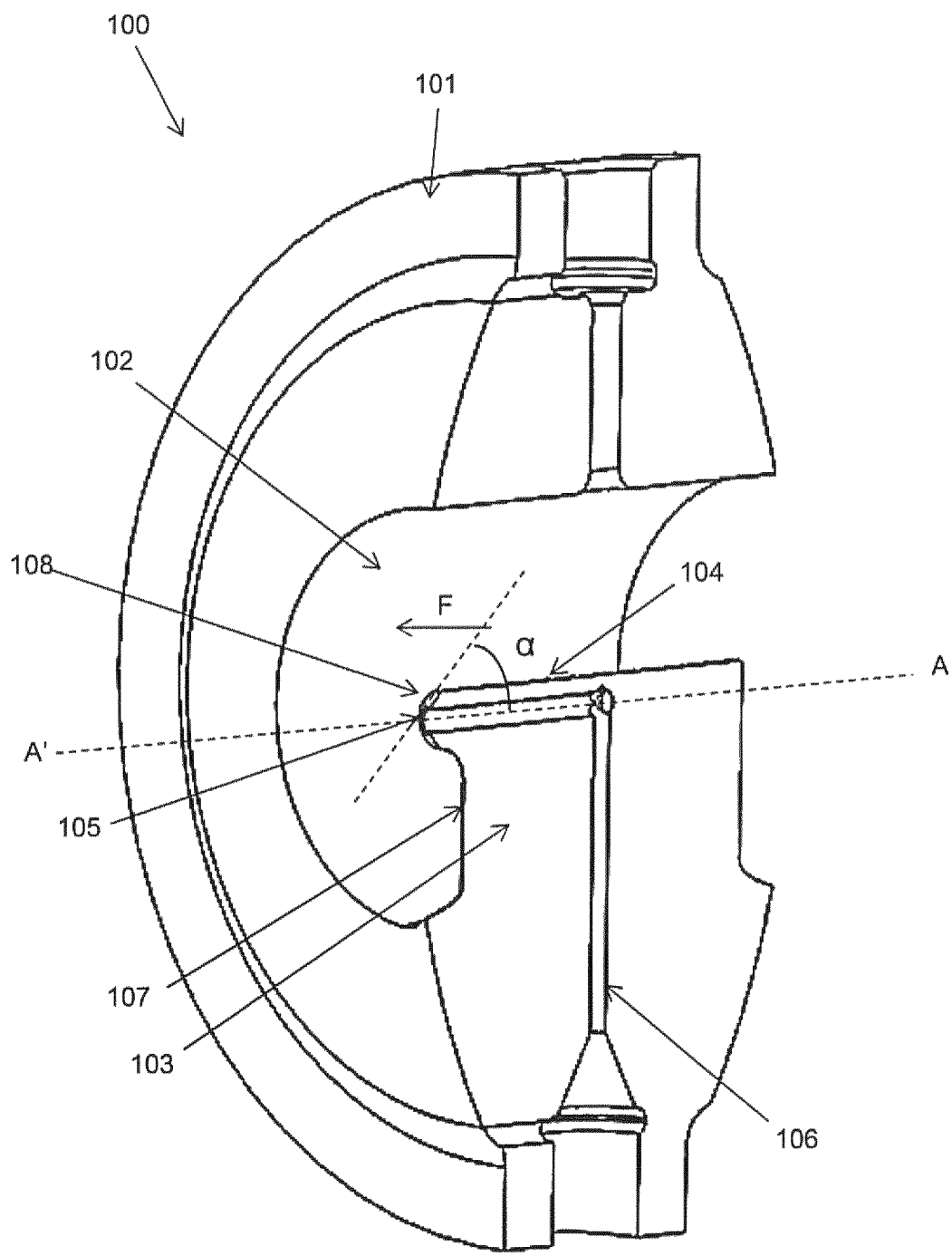
FIG. 3 shows the cross section of the embodiment of FIGS. 1-2.

In FIG. 3 a cross section is shown of the device 100 having the injector part 104 aligned with the central axis A-A' of the device. A supply channel 106 is shown as a passage through the annular part 101 and the support structure 103, leading to the nozzle 105 of the injector part 104.

In FIG. 3 a taper angle α is shown for tapered end 108 of the injector part 104, between the surface of the tapered end 108 and the central axis A-A'. Various taper angles α may be considered.

Computer simulation was performed in order to determine the effect of the shape and the position of the injector on mixing and distribution of a reactive fluid in a turbulent flow of a process fluid. In the simulations, a process flow is flowing through a pipe having an inner diameter of 59 mm and a liquid is injected into the pipe. The flow rate between the process flow and the liquid is more than 100. The process flow is a highly turbulent flow before and after the injection of the liquid.

The flow pattern of the liquid in the flow was visualized, which provided insights on the degree of back mixing. Further, the level of mixing was estimated by the calculation of coefficient of variation (CoV), which is a statistical measure of radial homogeneity. The location at which CoV=0.05 (a common industrial benchmark for good mixing, corresponding to 95% homogeneity) was calculated.

Comparative Example 1

The reactive fluid is injected from a small-diameter nozzle protruding from the inner wall towards the center of the pipe. The outlet of the nozzle has a circular cross section and was located at 10 mm from the inner wall.

CoV=0.05 was achieved at 7.1 m, which represents a relatively poor mixing performance. Back mixing was observed.

Comparative Example 2

The reactive fluid is injected from a small-diameter nozzle protruding from the inner wall towards the center of the pipe. The outlet of the nozzle has a circular cross section and was located at the center of the pipe.

CoV=0.05 was achieved at 4.0 m, which represents a better mixing performance. Back mixing was reduced but still observed.

Comparative Example 3

The reactive fluid is injected from a small-diameter nozzle protruding from the inner wall towards the center of the pipe. The outlet of the nozzle has a 45° cut facing downstream and was located at the center of the pipe.

The results were similar to Comparative Example 2, showing that the 45° cut has little influence under these conditions.

Example 4

The reactive fluid is injected by the device as illustrated in FIGS. 1-3.

CoV=0.05 was achieved at 2.6 m, which represents a very good mixing performance. No back mixing was observed.

The invention claimed is:

1. A device (100) for injecting and mixing a reactive fluid in a flow of a process fluid, comprising
    an annular part (101) having an outer wall and an inner wall (102), wherein the annular part (101) is arranged for having a flow of the process fluid in a transport direction (F);
    a support structure (103) connected to the inner wall (102) of the annular part (101);
    an injector part (104) mounted on the support structure (103), wherein the injector part (104) is cylindrically shaped and wherein the cylindrical axis A-A' of the injector part is parallel with a central axis of the annular part and is in the central part of the annular part (101);
    wherein the injector part (104) comprises a nozzle (105) for injecting the reactive fluid, disposed at a downstream side of the injector part relative to the transport direction (F);
    a supply channel (106) extending from the outer wall of the annular part (101) through the support structure (103) to the nozzle (105) of the injector part (104).

2. The device (100) according to claim 1, wherein the annular part (101), the support structure (103) and the injector part (104) are made from a single piece of metal.

3. The device (100) according to claim 1, wherein the cylindrical axis A-A' of the injector part (104) is located at a distance of 0 to ¼ D from the central axis of the annular part (101), where D is the inner diameter of the annular part (101).

4. The device (100) according to claim 3, wherein the cylindrical axis A-A' of the injector part coincides with the central axis of the annular part (101).

5. The device (100) according to claim 1, wherein the support structure (103) has a fin shape.

6. The device (100) according to claim 5, wherein the fin shaped support structure (103) and the injector part (104) have a common wedge shaped upstream front (201).

7. The device (100) according to claim 5, wherein the fin shaped support structure (103) has a wedge shaped downstream front (107).

8. The device (100) according to claim 5, wherein the fin shaped support structure (103) has a rounded base (202) where the fin shaped support structure (103) is connected to the annular part (101).

9. The device (100) according to claim 1, wherein the nozzle (105) is formed as a tapered extension (108) of the injector part (104), having the nozzle opening in the center of the tapered extension (108).

10. The device (100) according to claim 9, wherein the tapered extension has a taper angle in a range of 15°-60°.

11. A lens ring gasket or a cone ring gasket comprising the device (100) according to claim 1.

12. A reactor system comprising the device according to claim 1, wherein a reactive fluid is to be injected and mixed with a flow of a process fluid in the device.

13. A process for the preparation of a homopolymer or a copolymer of ethylene and a comonomer copolymerizable therewith in the reactor system according to claim 12, wherein the process fluid comprises ethylene and the reactive fluid is selected from the group consisting of the comonomer, an initiator, an inhibitor, a scavenger and a chain regulator.

14. The device (100) according to claim 1,
    wherein the annular part (101), the support structure (103) and the injector part (104) are made from a single piece of metal;
    wherein the cylindrical axis A-A' of the injector part (104) is located at a distance of 0 to ¼ D from the central axis of the annular part (101), where D is the inner diameter of the annular part (101);
    wherein the support structure (103) has a fin shape, wherein the fin shaped support structure (103) and the injector part (104) have a common wedge shaped upstream front (201), wherein the fin shaped support structure (103) has a wedge shaped downstream front (107), wherein the fin shaped support structure (103) has a rounded base (202) where the fin shaped support structure (103) is connected to the annular part (101);
    wherein the nozzle (105) is formed as a tapered extension (108) of the injector part (104), having the nozzle opening in the center of the tapered extension (108); and
    wherein the tapered extension has a taper angle in a range of 15°-60°.

15. The device (100) according to claim 1, wherein the support structure (103) has a fin shape, wherein the fin shaped support structure (103) and the injector part (104) have a common wedge shaped upstream front (201), wherein the fin shaped support structure (103) has a wedge shaped downstream front (107), wherein the fin shaped support structure (103) has a rounded base (202) where the fin shaped support structure (103) is connected to the annular part (101).

16. The device (100) according to claim 9, wherein the tapered extension has a taper angle in a range of 25°-35°.

\* \* \* \* \*